E. G. MATTHEWS.
Plow.
No. 77,996.
Patented May 19, 1868.
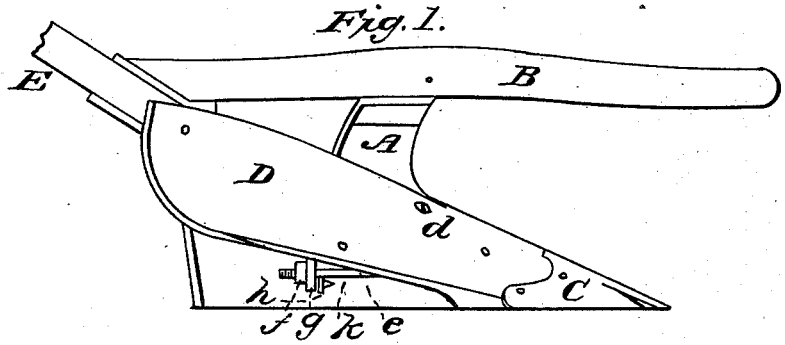
Fig. 1.
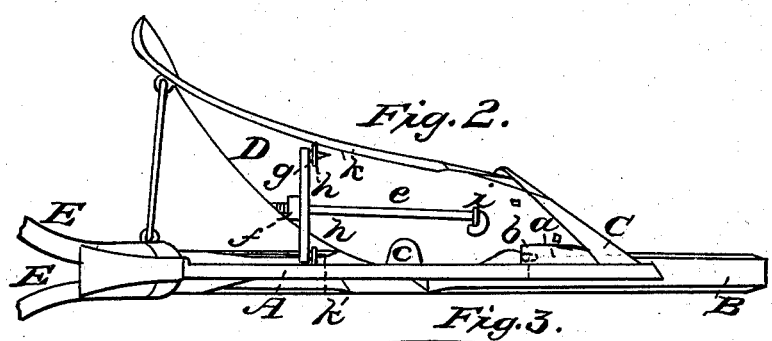
Fig. 2.
Fig. 3.
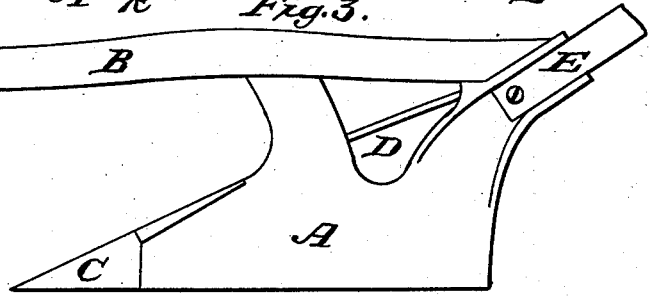
Fig. 4.
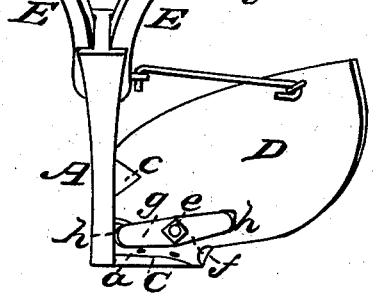
Witnesses
Inventor.
E. G. Matthews.
by his attorney
R. H. Eddy.

United States Patent Office.

ELBRIDGE G. MATTHEWS, OF BOSTON, MASSACHUSETTS, ASSIGNOR TO FRANK F. HOLBROOK, OF SAME PLACE.

*Letters Patent No. 77,996, dated May 19, 1868.*

IMPROVEMENT IN PLOUGHS.

*The Schedule referred to in these Letters Patent and making part of the same.*

TO ALL PERSONS TO WHOM THESE PRESENTS MAY COME:

Be it known that I, ELBRIDGE G. MATTHEWS, of Boston, in the county of Suffolk, and State of Massachusetts, have invented a new and useful Improvement in Ploughs; and I do hereby declare the same to be fully described in the following specification, and represented in the accompanying drawings, of which—

Figure 1 denotes a front side elevation,

Figure 2 a bottom view,

Figure 3 a rear side elevation, and

Figure 4 a rear end view of a plough provided with my invention.

In such drawings, A denotes the plough-standard, or the same and the land-side; B, the beam; C, the nose or ploughshare, and D, the mould-board. E E are parts of the handles.

The nose C is bolted to the mould-board. The latter, at its interior surface, I provide with a projection, $a$, having a round hole or mortise in it to receive a tenon, $b$, extended from the standard on the inner side of its toe. I also provide the standard with a bracket or rest, $c$, to project from its inner side, such bracket being arranged as represented.

The mould-board is to rest directly on this bracket, and be held thereto by a bolt or a screw, $d$, going through the mould-board, and either into or through the bracket.

Furthermore, I employ, for supporting the mould-board laterally, and for drawing and holding it closely back on the tenon, a hooked screw-bolt, $e$, a nut, $f$, a duplex, conical, or tapering dog or brace, $g$, and three eyes or staples, $h\ h$ and $i$, the whole being arranged and formed in manner as exhibited in the drawings.

Two of the eyes or staples project from the inner surface of the mould-board, and the other projects from the inner side of the standard. The bolt, which hooks into the anterior staple or eye, passes through the middle of the dog or brace $g$, and has the nut screwed on it and against the rear side of the said brace. The tapering or conical points $k\ k$, of the brace, pass into the two eyes $h\ h$. On screwing up the nuts, the said points will be forced closely into the eyes $h\ h$, and the whole will connect the mould-board to the standard, support the mould-board to great advantage, and, besides, will admit of a mould-board of different form being easily substituted when such may be desirable.

1. I claim the combination and arrangement of the bracket or rest $c$, the tenon $b$, and the mortised projection $a$, with the mould-board D and standard A of the plough.

2. I also claim the combination and arrangement of the duplex-pointed dog or brace $g$, the hooked bolt $e$, the nut $f$, and the eyes or staples $h\ h$ and $i$, with the bracket, standard, and the mould-board, connected by means substantially as set forth.

ELBRIDGE G. MATTHEWS.

Witnesses:
F. P. HALE, Jr.,
J. R. SNOW.